United States Patent
Yumer et al.

(10) Patent No.: US 9,158,915 B1
(45) Date of Patent: Oct. 13, 2015

(54) SYSTEMS AND METHODS FOR ANALYZING ZERO-DAY ATTACKS

(71) Applicant: Symantec Corporation, Mountain View, CA (US)

(72) Inventors: Leylya Yumer, Paris (FR); Tudor Dumitras, Bethesda, MD (US)

(73) Assignee: Symantec Corporation, Mountain View, CA (US)

( * ) Notice: Subject to any disclaimer, the term of this patent is extended or adjusted under 35 U.S.C. 154(b) by 97 days.

(21) Appl. No.: 13/901,977

(22) Filed: May 24, 2013

(51) Int. Cl.
*G06F 21/00* (2013.01)
*G06F 21/55* (2013.01)

(52) U.S. Cl.
CPC .................................. *G06F 21/55* (2013.01)

(58) Field of Classification Search
CPC . G06F 21/55; H04L 63/1433; H04L 63/1441; H04L 9/005; H04L 9/002
USPC .......................................................... 726/13
See application file for complete search history.

(56) References Cited

U.S. PATENT DOCUMENTS

| | | | |
|---|---|---|---|
| 8,621,618 B1 * | 12/2013 | Ramsey et al. | 726/22 |
| 8,955,138 B1 | 2/2015 | Mahadik et al. | |
| 2006/0026682 A1 * | 2/2006 | Zakas | 726/22 |
| 2008/0098476 A1 * | 4/2008 | Syversen | 726/23 |
| 2008/0984475 * | 4/2008 | Syversen | 726/23 |
| 2014/0245443 A1 * | 8/2014 | Chakraborty | 726/23 |

OTHER PUBLICATIONS

Frei et al., Large-Scale Vulnerability Analysis, SIGCOMM'06 Workshops Sep. 11-15, 2006, Pisa, Italy. Copyright 2006 ACM 1-59593-417-0/06/0009, pp. 131-138.*

* cited by examiner

*Primary Examiner* — Harunur Rashid
(74) *Attorney, Agent, or Firm* — ALG Intellectual Property, LLC

(57) ABSTRACT

A computer-implemented method for analyzing zero-day attacks may include 1) identifying, within a database of known security vulnerabilities, disclosure timing information that indicates when a security vulnerability was publicly disclosed, 2) correlating a file with the security vulnerability by searching a database of file activity for at least one file that is associated with an attack that exploits the security vulnerability, 3) identifying, within the database of file activity, activity timing information indicating timing of one or more activities that involve the file and that occurred on endpoint computing devices before the security vulnerability was publicly disclosed, and 4) comparing the disclosure timing information with the activity timing information to investigate a potential zero-day attack that exploits the security vulnerability. Various other methods, systems, and computer-readable media are also disclosed.

20 Claims, 7 Drawing Sheets

SYSTEMS AND METHODS FOR ANALYZING ZERO-DAY ATTACKS

BACKGROUND

A zero-day attack may refer to a security or malware attack that occurs before public disclosure of a vulnerability that the attack exploits. An attacker may discover the vulnerability inadvertently or by studying the software system that contains the vulnerability. By studying the software system, or by learning about the vulnerability from others, the attacker may develop a method or program for exploiting the vulnerability.

Notably, the attacker may keep the vulnerability and the exploit secret. The secrecy of the vulnerability and the exploit may make it far more difficult to detect or prevent the attack. Accordingly, the attacker may desire to maintain and take steps to ensure the secrecy. For the same reason, the attacker may only launch the attack on a small number of targets. The attacker may specify high value targets or may specify targets requiring a long time to compromise. Because the zero-day attack may be more difficult to detect, the attack can be better suited for targeting a smaller number of high value targets, especially over a long period of time.

Because of the secretive nature of zero-day attacks, not much is currently known about them. For example, relatively little is known about the prevalence, successfulness, or dangerousness of zero-day attacks. When attacks are finally discovered, the discovery is typically fortuitous and not representative of zero-day attacks in general. The lack of representative samples or more comprehensive data about zero-day attacks may make it more difficult to study the attacks and guard against them (e.g. by resolving vulnerabilities, developing patches, immunizing systems, and/or taking counter-measures against zero-day attackers).

Because zero-day attacks may exploit vulnerabilities that are not yet disclosed to the public, traditional security systems that rely on antivirus or intrusion-detection signatures may fail to detect these attacks. The failure of security systems to detect attacks may provide attackers with a long window to exploit their targets. For this reason, zero-day exploits are often used in targeted attacks. Moreover, security attacks often target non-executable files, which traditional security systems may have particular difficulty analyzing. Accordingly, the instant disclosure identifies and addresses a need for additional and improved systems and methods for analyzing zero-day attacks.

SUMMARY

As will be described in greater detail below, the instant disclosure generally relates to systems and methods for analyzing zero-day attacks by correlating a file with a known security vulnerability and comparing timing information about activity of the file on endpoint computing devices with other timing information that indicates when a disclosure that the security vulnerability is known occurred. By determining whether the timing information of the activity of the file or the timing information of the disclosure of the security vulnerability indicates an earlier time, the systems and methods presented herein may ascertain whether a zero-day attack has occurred.

In one example, a computer-implemented method for analyzing zero-day attacks may include 1) identifying, within a database of known security vulnerabilities, disclosure timing information that indicates when a security vulnerability was publicly disclosed, 2) correlating a file with the security vulnerability by searching a database of file activity for at least one file that is associated with an attack that exploits the security vulnerability, 3) identifying, within the database of file activity, activity timing information indicating timing of one or more activities that involve the file and that occurred on endpoint computing devices before the security vulnerability was publicly disclosed, 4) comparing the disclosure timing information with the activity timing information to investigate a potential zero-day attack that exploits the security vulnerability.

Comparing the disclosure timing information with the activity timing information may include determining whether the activity timing information indicates a zero-day attack by determining whether the activity timing information indicates an earlier time than the disclosure timing information.

Comparing the disclosure timing information with the activity timing information also include determining that the activity timing information indicates a zero-day attack by determining that the disclosure timing information indicates an earlier time than the activity timing information. Comparing the disclosure timing information with the activity timing information also include determining that the activity timing information does not indicate a zero-day attack by determining that the disclosure timing information does not indicate an earlier time than the activity timing information.

The method may further include identifying a plurality of items of activity timing information for the file. The method may additionally include identifying an earliest time among the plurality of items of activity timing information for the file. Moreover, the method may also include determining whether the activity timing information indicates a zero-day attack by determining whether the earliest time indicates an earlier time than the disclosure timing information.

The database of known security vulnerabilities may include a public database. The disclosure timing information may indicate when the security vulnerability was made known in the public database. The disclosure timing information may indicate when a software patch was released. The disclosure timing information may also include timing information posted on a public website about security vulnerabilities.

The database of file activity may include antivirus telemetry data. The activity timing information may indicate when an antivirus program detected a threat. The method may include identifying when the antivirus program on a client device detected the threat. The method may further include determining that the client device downloaded an executable after the antivirus program detected the threat. Moreover, the method may also include correlating in memory the downloaded executable with the threat detection.

The database of file activity may include binary reputation data. The activity timing information may indicate when a client device downloaded an executable.

Identifying the database of known security vulnerabilities may include constructing the database of file activity by identifying a third database indicating security vulnerabilities, as well as identifying a fourth database indicating security exploits. Constructing the database of known security vulnerabilities may further include correlating, in the database of known security vulnerabilities, security vulnerabilities from the third database with exploits from the fourth database that exploit a respective security vulnerability. Identifying the database of known security vulnerabilities may include constructing the database by correlating at least one hash with each of the exploits that are further correlated with a respective security vulnerability.

In one embodiment, a system for implementing the above-described method may include 1) an identification module that identifies, within a database of known security vulnerabilities, disclosure timing information that indicates when a security vulnerability was publicly disclosed, 2) a correlation module that correlates a file with the security vulnerability by searching a database of file activity for at least one file that is associated with an attack that exploits the security vulnerability, where the identification module further identifies, within the database of file activity, activity timing information indicating timing of one or more activities that involve the file and that occurred on endpoint computing devices before the security vulnerability was publicly disclosed, 3) a comparison module that compares the disclosure timing information with the activity timing information to investigate a potential zero-day attack that exploits the security vulnerability, and 4) at least one processor that executes the identification module, the correlation module, and the comparison module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify, within a database of known security vulnerabilities, disclosure timing information that indicates when a security vulnerability was publicly disclosed, 2) correlate a file with the security vulnerability by searching a database of file activity for at least one file that is associated with an attack that exploits the security vulnerability, 3) identify, within the database of file activity, activity timing information indicating timing of one or more activities that involve the file and that occurred on endpoint computing devices before the security vulnerability was publicly disclosed, and 4) compare the disclosure timing information with the activity timing information to investigate a potential zero-day attack that exploits the security vulnerability.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
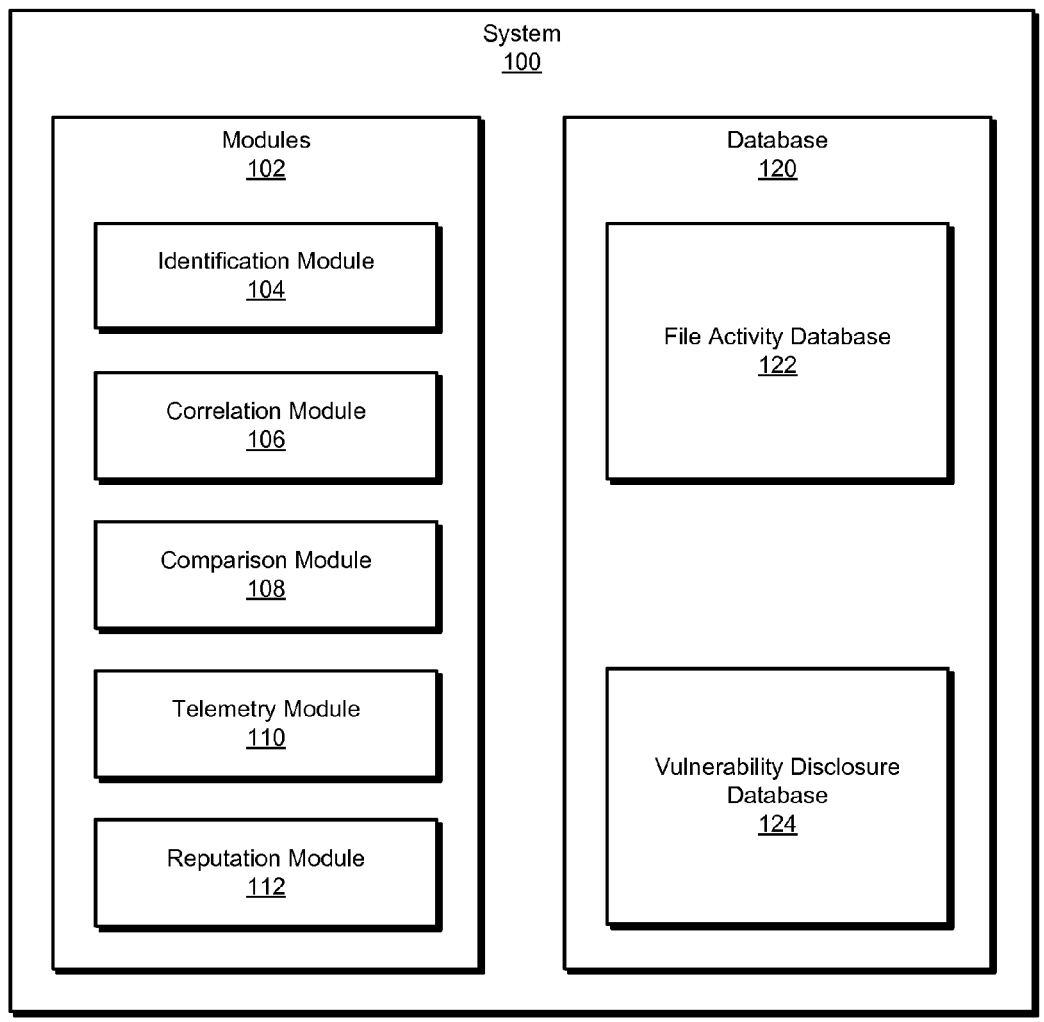
FIG. 1 is a block diagram of an exemplary system for analyzing zero-day attacks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for analyzing zero-day attacks. As will be explained in greater detail below, while detecting ongoing zero-day attacks may be difficult, sometimes vulnerabilities in software products are discovered after finding exploits in the field (i.e., exploits that are leveraged against unaware and/or non-cooperating targets in the world at large and/or outside of a controlled environment). However, this discovery may not reveal how prevalent zero-day attacks are because the attacks identified accidentally are not a representative sample of all the zero-day attacks around the world. Moreover, the discovery does not indicate how long the attacks remained undetected, because the starting point of the attack is generally not identified.

Past zero-day attacks delivered through executable exploit files may potentially be detected by analyzing anti-virus telemetry that includes submissions to reputation-based security systems. However, many zero-day exploits may be delivered through non-executable files. Accordingly, some zero-day attacks performed via non-executable files may be undiscoverable using reputation databases alone. However, by correlating the information collected by reputation-based systems with information about malware behavior provided by dynamic analysis, the systems described herein may discover zero-day attacks delivered through exploits of both executable and non-executable files.

In view of the above, by associating vulnerabilities with particular exploits, and by comparing timing information for activity by those exploits on endpoint computing devices prior to public disclosure of the vulnerabilities, systems described herein may detect a zero-day attack. More specifically, systems described herein may infer that the exploit activity prior to disclosure of the vulnerability indicates a zero-day attack. Systems described herein may also identify the beginning of a zero-day attack by identifying the earliest time indicating exploit activity. Systems described herein may repeat this process to identify a comprehensive or exhaustive set of known (according to these methods) zero-day attacks within a set of data or monitored endpoint computing devices, thereby indicating the prevalence of zero-day attacks and their durations.

Figure 2:
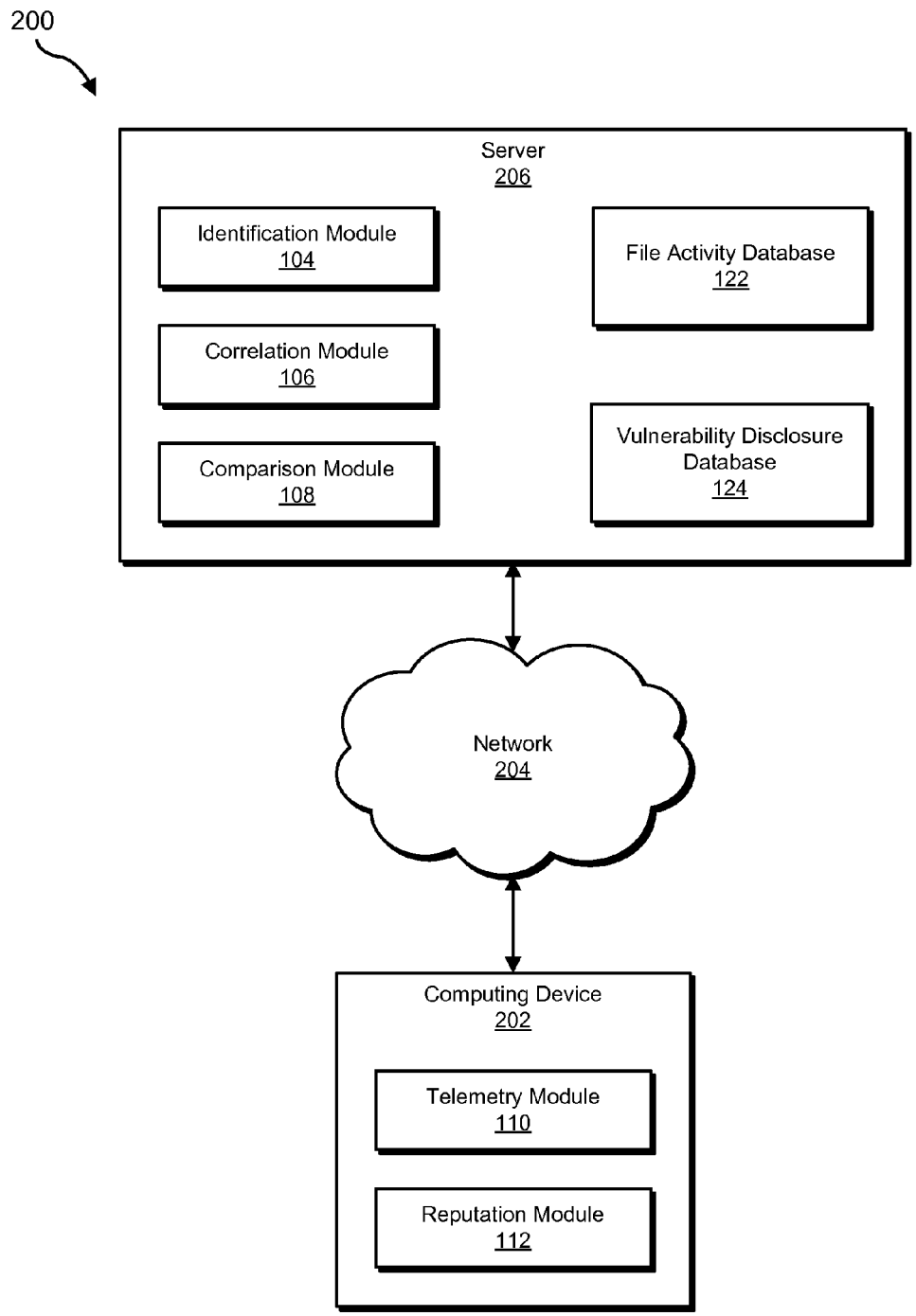
FIG. 2 is a block diagram of an exemplary system for analyzing zero-day attacks.
Figure 4:
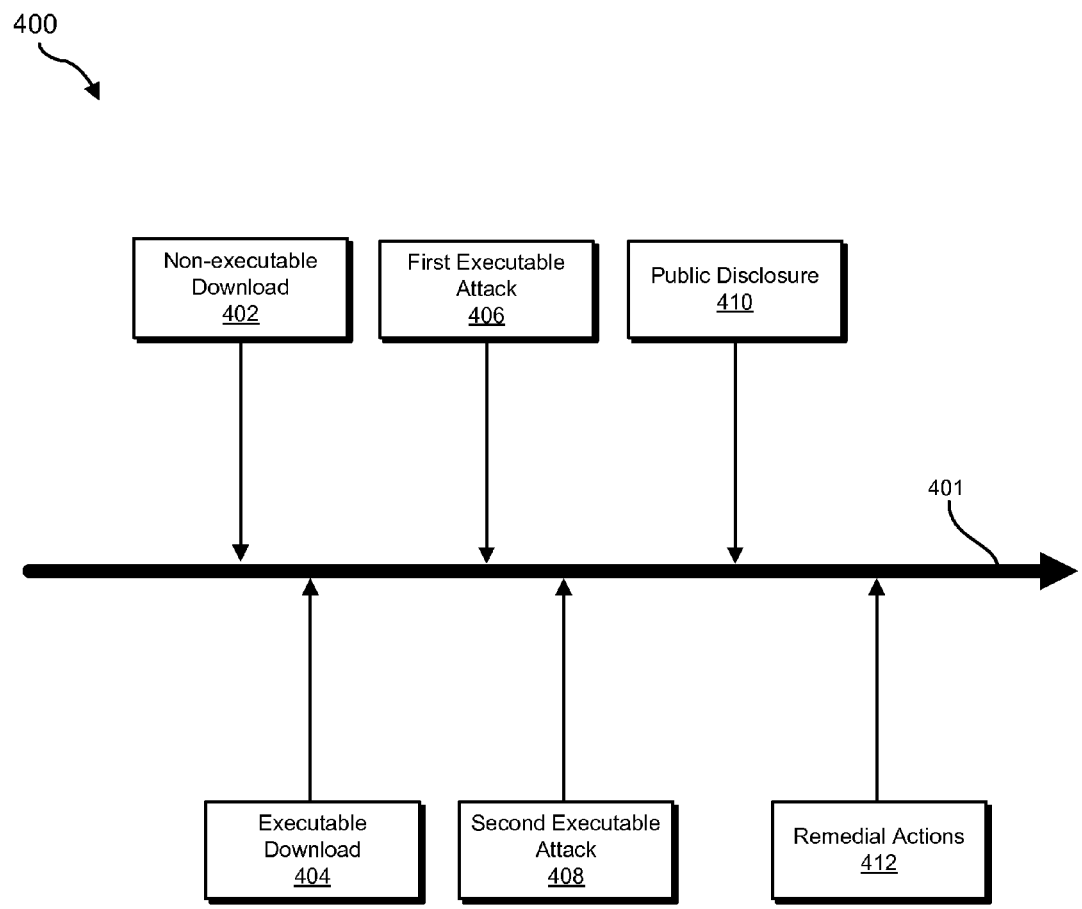
FIG. 4 is a block diagram of a timing of a zero-day attack.
Figure 5:
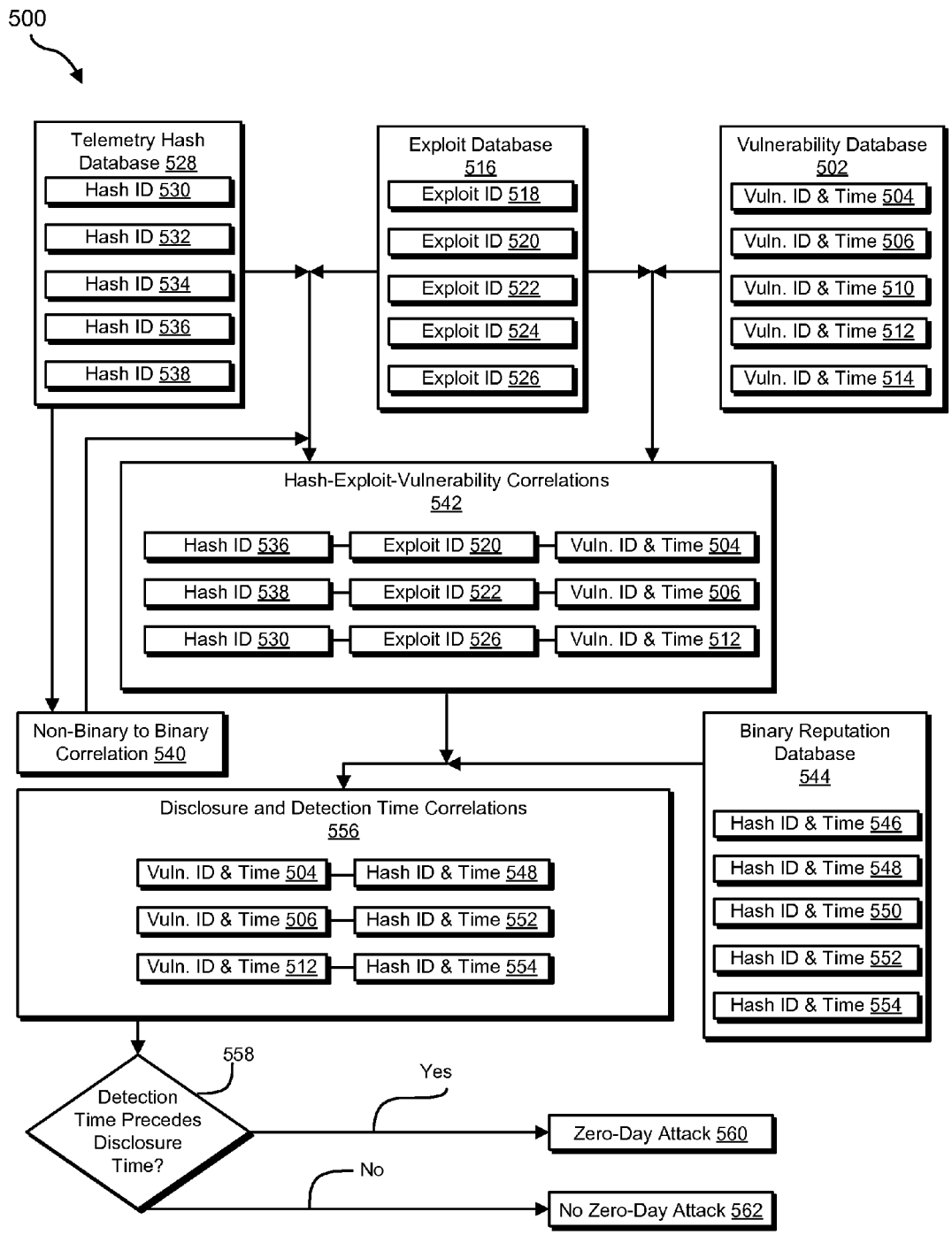
FIG. 5 is a block diagram of an exemplary system for analyzing zero-day attacks.

The following will provide, with reference to FIGS. 1, 2, and 5, detailed descriptions of exemplary systems for analyzing zero-day attacks. Detailed descriptions of corresponding computer-implemented methods will also be provided in connection with FIG. 3. Detailed descriptions of a timing of a zero-day attack will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for analyzing zero-day attacks. As illustrated in this figure, exemplary system 100 may include one or more modules 102 for performing one or more tasks. For example, and as will be explained in greater detail below, exemplary system 100 may include an identification module 104 that identifies, within a database of known security vulnerabilities, disclosure timing information that indicates when a security vulnerability was publicly disclosed. Exemplary system 100 may also include a correlation module 106 that correlates a file with the security vulnerability by searching a database of file activity for at least one file that is associated with an attack that exploits the security vulnerability. Identification module 104 may further identify, within the database of file activity, activity timing information indicating timing of one or more activities that involve the file and that occurred on endpoint computing devices before the security vulnerability was publicly disclosed.

In addition, and as will be described in greater detail below, exemplary system 100 may include a comparison module 108 that compares the disclosure timing information with the activity timing information to investigate a potential zero-day attack that exploits the security vulnerability. In some examples, exemplary system 100 may also include a telemetry module 110 that reports telemetry data about antivirus activity at a computing device to a server. Exemplary system 100 may also include a reputation module 112 that reports data about activity (e.g. downloading) of files on endpoint computing devices. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a file activity database 122 that stores historical data about file activity on endpoint computing devices. File activity database 122 may correspond to the database of file activity that associates the file with an attack that exploits the security vulnerability. File activity database 122 may also store activity timing information indicating timing of one or more activities that involve the file and that occurred on endpoint computing devices before the security vulnerability was publicly disclosed. Database 120 may also include vulnerability disclosure database 124 that stores data about public disclosures of security vulnerabilities. Vulnerability disclosure database 124 may correspond to the database of known security vulnerabilities that stores disclosure timing information that indicates when a security vulnerability was publicly disclosed.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, facilitate computing device 202 and/or server 206 in analyzing zero-day attacks. For example, and as will be described in greater detail below, one or more of modules 102 may cause computing device 202 and/or server 206 to 1) identify, within a database of known security vulnerabilities, disclosure timing information that indicates when a security vulnerability was publicly disclosed, 2) correlate a file with the security vulnerability by searching a database of file activity for at least one file that is associated with an attack that exploits the security vulnerability, 3) identify, within the database of file activity, activity timing information indicating timing of one or more activities that involve the file and that occurred on endpoint computing devices before the security vulnerability was publicly disclosed, and 4) compare the disclosure timing information with the activity timing information to investigate a potential zero-day attack that exploits the security vulnerability.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of receiving or processing data about zero-day attacks. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

In the example of FIG. 2, system 200 may further include telemetry module 110 and reputation module 112. Telemetry module 110 may report telemetry data about antivirus activity at computing device 202 to server 206. Telemetry module 110 may be included on plural endpoint computing devices in the form of computing device 202, and server 206 may receive telemetry data from each of the plural endpoint computing devices. The telemetry data may include any data about detection of exploits (i.e. threats) on endpoint computing devices, including a time, type, size, and identifier of the exploits. Reputation module 112 may report data about detection and/ or downloading of files on endpoint computing devices in the form of computing device 202 to server 206 or another server. Notably, reputation module 112 may report detection, downloading, opening, saving, modification, and/or execution of files (i.e. file activity) without detecting, knowing, or suspecting that the file corresponds to an exploit or that the file has been executed or otherwise used in an exploit. A server, like server 206, may aggregate data reported from reputation module 112 on endpoint computing devices to estimate a reputation for respective files (e.g., by identifying suspicious patterns or behavior of the file and/or correlating the file with exploits such as those reported by telemetry module 110).

In the example of FIG. 2, modules 102 in server 206 may use data received from telemetry module 110 and/or reputation module 112 to analyze zero-day attacks, as discussed in the description corresponding to FIG. 3 below. For example, identification module 104 may use the data to partially or completely construct file activity database 122. Additionally or alternatively, one or more of modules 102 may reside on a client device, such as computing device 202.

Figure 3:
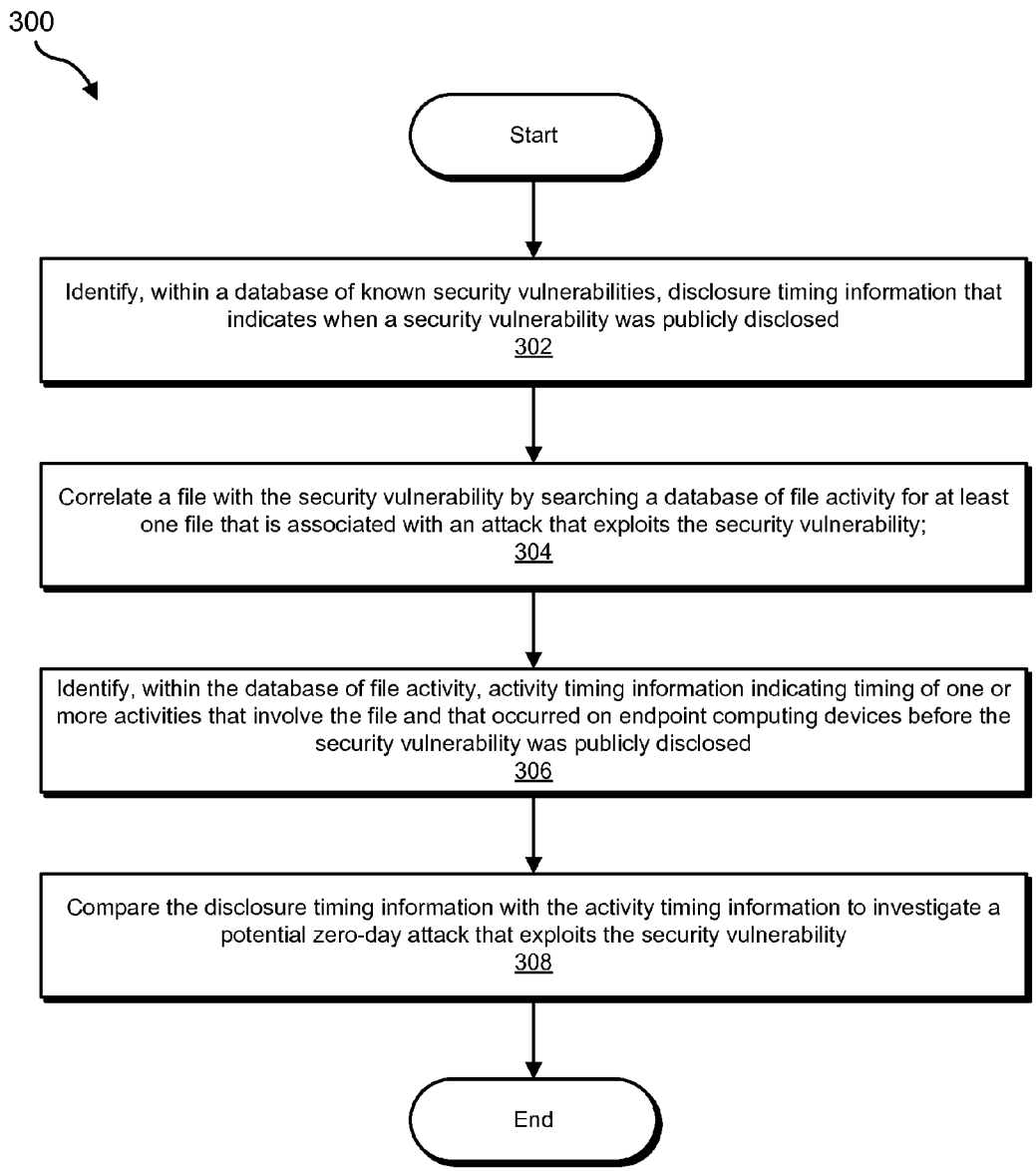
FIG. 3 is a flow diagram of an exemplary method for analyzing zero-day attacks.

FIG. 3 is a flow diagram of an exemplary computer-implemented method 300 for analyzing zero-day attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify, within a database of known security vulnerabilities, disclosure timing information that indicates when a security vulnerability was publicly disclosed. For example, at step 302 identification module 104 may, as a part of server 206 in FIG. 2, identify, within vulnerability disclosure database 124, disclosure timing information that indicates when a security vulnerability was publicly disclosed.

Identification module 104 may identify the disclosure timing information in a variety of ways. For example, identification module 104 may query the vulnerability disclosure database with an identifier of the security vulnerability for the date of disclosure. Additionally or alternatively, identification module 104 may perform one or more data mining operations (e.g., on one or more repositories of security publications) to collect information about the disclosure of the vulnerability (including, e.g., an earliest observed public disclosure date). In some examples, the vulnerability disclosure database may include a public database. The disclosure timing information may indicate when the security vulnerability was made known in the public database. The disclosure timing information may indicate when a software patch was released (in addition to, or as a surrogate for, indicating public disclosure of the security vulnerability, for example if the patch indicates when disclosure occurred). The disclosure timing information may include timing information posted on a public website about security vulnerabilities. The database of known security vulnerabilities may correspond to the OPEN SOURCE VULNERABILITIES DATABASE and/or MICROSOFT BULLETINS.

FIG. 4 includes a block diagram showing a timeline 400 of a zero-day attack. Timeline 400 shows a direction of time in chronological order from left to right according to the arrow. Points 402-408 indicate events or activity of a file on an endpoint computing device. Notably, the events and activity of points 402-408 occur prior to public disclosure of a corresponding vulnerability at point 410 (i.e. a vulnerability that the earlier file or threat activity exploits). At point 402, a non-executable file may be downloaded to a client device like computing device 202. At point 404, the non-executable file may cause an executable file to be downloaded to the client device (e.g. by opening a non-executable image, document, or other content file). At points 406 and 408 the downloaded executable may cause first and second executable attacks (e.g., security and/or malware attacks). Notably, identification module 104 may identify disclosure timing information within the database of known security vulnerabilities that indicates point 410 as the time when disclosure of the security vulnerability occurred. The disclosure timing information (and activity timing information) may indicate an approximate, or precise, degree of time, so long as the information is sufficiently precise for comparison module to compare the two and thereby investigate or identify a zero-day attack, as discussed further below.

As used herein, the phrase "executable file" may refer to any collection of executable instructions. Examples of executable files include portable executable files, native executable files, library files (such as dynamic linked libraries and dynamic shared objects), bytecode files executed within an interpreter, and/or script files. As used herein, the phrase "non-executable file" may refer to any file that is not an executable file. In some examples, the phrase "non-executable file" may refer to a file that contains no computer-executable instructions. Additionally or alternatively, the phrase "non-executable file" may refer to a file that may contain scripted instructions that may be interpreted and implemented by an application that loads the file in order to extend and/or enable a document that the file represents. Examples of non-executable files include, without limitation, textual documents, images, configuration files, and spreadsheets. For example, a non-executable file may include a .pdf file, a .doc file, an .xls file, or an .swf file.

FIG. 5 includes a block diagram of an exemplary system 500 for analyzing zero-day attacks. System 500 may include vulnerability database 502, telemetry hash database 528, binary reputation database 544, and disclosure and detection time correlations 556. The database of known security vulnerabilities may correspond to vulnerability database 502 (storing vulnerability identifiers and corresponding timing information 504-514) and/or hash-exploit-vulnerability correlations 542 in FIG. 5, as discussed further below.

As illustrated in FIG. 3, at step 304 one or more one or more of the systems described herein may correlate a file with the security vulnerability by searching a database of file activity for at least one file that is associated with an attack that exploits the security vulnerability. For example, at step 304 correlation module 106 may, as a part of server 206 in FIG. 2, correlate a file with the security vulnerability by searching file activity database 122 for at least one file that is associated with an attack that exploits the security vulnerability.

Correlation module 106 may correlate the file with the security vulnerability in a variety of manners. In the example of FIG. 5, correlation module 106 may search an exploit database, like exploit database 516 (containing exploits 518-526), and/or a hash or antivirus telemetry database, like telemetry hash database 528 (containing hashes and hash identifiers 530-538), and identify exploits and/or hashes for exploit files that exploit a corresponding security vulnerability. Correlation module 106 may search these databases by searching for an identifier that identifies the security vulnerability. Correlation module 106 may also repeat the search for every (or substantially every) vulnerability listed in vulnerability database 502, or listed in a designated or predetermined set within database 502. The identifier may include a number that identifies the security vulnerability in a COM- MON VULNERABILITIES AND EXPOSURES (CVE) database, which may correspond to the database of known security vulnerabilities (or vulnerability database 502 in FIG. 5). Correlation module 106 may also perform correlations in serial, by first searching exploit database 516 for exploits that exploit the security vulnerability and then searching for hashes in telemetry hash database 528 that identify a file (or polymorphic variation of a file) used by each of the identified exploits. Not all vulnerabilities in vulnerability database 502 may have matching exploits and/or hashes in exploit database 516 and/or telemetry hash database 528. Moreover, multiple exploits may exploit the same security vulnerability, and multiple hashes may correspond to the same exploit (e.g. as different files and/or polymorphic variations of files or file sets used by the same exploit). In some cases, identification module 104 may identify, for each exploit, the earliest activity (e.g. downloading) from among all downloads of files (including polymorphic variations of files) to one or more endpoint computing devices as the activity timing information for that exploit.

Upon making these correlations, correlation module 106 may store the correlations in memory, such as in hash-exploit-vulnerability correlations 542. Correlation module 106 may store the correlations as triplets, or as a couplet of couplets (i.e. hash ID and exploit ID, and exploit ID and vulnerability ID). Correlation module 106 may generally store in memory any data structure that specifies the correlations such that comparison module 108 may use the correlations to analyze zero-day attacks according to method 300.

As illustrated in FIG. 3, at step 306 one or more of the systems described herein may identify, within the database of file activity, activity timing information indicating timing of one or more activities that involve the file and that occurred on endpoint computing devices before the security vulnerability was publicly disclosed. For example, at step 306, identification module 104 may identify, within the database of file activity, activity timing information indicating timing of one or more activities that involve the file and that occurred on endpoint computing devices before the security vulnerability was publicly disclosed.

Identification module 104 may identify activity timing information indicating timing of one or more activities that involve the file and that occurred on endpoint computing devices before the security vulnerability was publicly disclosed in a variety of ways. Identifying the activity timing information may include identifying a single item of activity timing information for the file. Identifying the activity timing information may include identifying a plurality of items of activity timing information for the file. Identifying the activity timing information may also include identifying an earliest time among the plurality of items of activity timing information for the file. For example, if multiple items of timing information, on the same or different client computers, indicate activity of the file, identification module 104 may determine the earliest time at which activity of the file is indicated within the multiple items of timing information (i.e. thereby identifying or estimating the potential start of a zero-day attack).

In the example of FIG. 4, identification module 104 may identify point 402 as the earliest time (if the time of point 402 is recorded or available to module 104) or point 404 as the earliest time (if the time of point 402 is not recorded or available), as discussed further below. Moreover, if an antivirus program detects an attack using the non-executable file, that detection may occur after both the non-executable file was downloaded (i.e. downloaded without detection) and after the non-executable file caused the executable file to be downloaded. In that case, identification module 104 may identify the download of the executable file at point 404 as the earliest time (i.e. to estimate the start of the zero-day attack). Although FIG. 4 shows a timeline corresponding to a single client device, server 206 or another server may aggregate data from multiple client devices about the same non-executable and executable files, and determine the time of the earliest activity and/or event from among all of the multiple client devices.

At point 412 remedial action may be taken. Security vendors may provide a patch or update, or take other action, to resolve the vulnerability. Upon public disclosure and/or the remedial action, the non-executable and/or executable files used in the zero-day attack may stop attacking (i.e. because they are thwarted by the security update or to avoid detection of the zero-day attack). After public disclosure at point 410, the systems and methods described herein, such as method 300, may analyze the zero-day attack.

In general, the activity timing information may indicate a timing of activity regarding that file. For example, the activity timing information may indicate a time that a file was detected at, downloaded to, or executed on a client device like client device 202. The activity timing information may indicate when an antivirus program detected a threat. The activity timing information may also indicate a time of occurrence or duration of a potential antivirus threat by the antivirus program. The antivirus program may associate the file with the detected threat.

The database of file activity may also include binary reputation data. In the example of FIG. 5, binary reputation database 544 may include data about the reputations of executable files, including hash identifiers and corresponding timing information 546-554. Notably, binary reputation database 544 may also contain activity timing information about the timing of activity by those files on endpoint computing devices. Specifically, in some cases, binary reputation database 544 may include activity timing information indicating when the binary files are downloaded to endpoint computing devices. Binary reputation database 544 may be included within a larger system, such as system 100 or 200, that is configured to collect activity timing information about when any executable file or non-executable file is found on, downloaded to, executed on, and/or detected as malicious or classified as malicious at an endpoint computing device. The larger system may be configured to collect that activity timing information for all executable and/or non-executable files within a predetermined or protected set of endpoint computing devices over a predetermined period of time (or indefinitely). Binary reputation database 544 may collect and store the activity timing information regardless of whether a file is an executable, whether the file is executed or dormant, and/or whether the file is known or suspected to be associated with malware.

Telemetry hash database 528 may include telemetry data for both executable and non-executable files. In some cases, however, telemetry hash database 528 may not contain data about the mere presence, or the mere downloading, of non-executable files. In contrast, in some of these cases, binary reputation database 544 may include activity timing information about at least the downloading of executable files to endpoint computing devices. To estimate the timing of a zero-day attack that uses non-executable files, identification module 104 (and/or correlation module 106) may correlate a non-executable file with an executable file that later is downloaded to (and/or executed on) a same endpoint computing device (e.g., that is downloaded to and/or executed on the same endpoint computing device within a specified period of time or that is downloaded to and/or executed on the same endpoint computing device automatically in response to opening the non-executable file). Correlation module 106 may correlate the non-binary file with the downloaded executable using information (i.e. from research analytics at an antivirus vendor) indicating the non-binary file is associated with, or causes downloading of, the executable file. That correlation may be performed according to non-binary to binary conversion step 540 in FIG. 5. Additionally, or alternatively, correlating the non-executable file may include creating a list of each executable file downloaded to the endpoint computing device between downloading or opening of the non-executable file and another point in time, such as point 410 or 412 in FIG. 4. Creating the list may include searching application program interface calls recorded in a dynamic analysis trace for executable files. To identify which of the executable files in the list may be correlated with the non-executable file, identification module 104 may search for executables (e.g. hashes of executables) known to be malicious, such as those in telemetry hash database 528. Upon correlating the non-executable file with at least one executable file, identification module 104 may use activity timing information about file activity for the non-executable file (if recorded and available) and/or the executable file as the activity timing information. Because a malicious executable may be downloaded after the non-executable file activity without a necessary causal connection between the malicious executable and the non-executable file, this correlation may only provide an estimation, probability, or tentative conclusion of correlation within a zero-day attack (e.g. in the absence of research analysis by a security or antivirus vendor that associates the non-executable and executable files, such as by specifying that the non-executable is configured to directly or indirectly cause the download or execution of the executable file). For that reason, the correlation between non-executable and executable files is optional and may be omitted.

Identifying the activity timing information may also include constructing the database of file activity by correlating at least one hash with each of the exploits that are further correlated with a respective security vulnerability. For example, hash-exploit-vulnerability correlations 542 may correlate hash IDs 536, 538, and 530 with vulnerability IDs (and corresponding timing information) 504, 506, and 512.

Identification module 104 may search the database of file activity for activity timing information. Identification module 104 may generally search for, and/or identify, any activity timing information associated with files known to be associated with the security vulnerability, including files constituting, or used by, an exploit that exploits the vulnerability. The activity timing information may indicate a timing of downloading, saving, opening, modifying, and/or executing the file. The activity timing information may also indicate a timing of downloading, detection, execution, or attack by an exploit that uses or includes the file. In the example of FIG. 5, one or more of telemetry hash database 528, exploit database 516, binary reputation database 544, and/or hash-exploit-vulnerability correlations 542 may correspond to the database of file activity. Moreover, each of these databases may include timing information about file and/or exploit activity on endpoint computing devices, and one or more databases may supplement timing information by including timing information, of one or more types, that one or more other databases lack.

In some cases, one database may lack activity timing information but indicate an association between a file and an exploit, while another database indicates activity timing information but lacks information associating the file with the exploit. For example, telemetry hash database 528 may associate files, and variations of files, with exploits. But telemetry hash database 528 may lack activity timing information, of one or more types (e.g. timing downloading, saving, opening, modifying, and/or executing), for those files and hashes. In contrast, binary reputation database 544 may include activity timing information (e.g. timing downloading, saving, opening, modifying, and/or executing), including those within hash identifier and time pairs 546-554, but lack information associating files or hashes with exploits. In that case, identification module 104, alone or with correlation module 106, may correlate, or match, exploits and/or corresponding hashes with exploits and/or corresponding hashes in binary reputation database 544, as discussed above. For example, if telemetry hash database 528 lacks one or more items of activity timing information about a hash, correlation module 106 may correlate, or match, the hash to a same (or corresponding) hash or executable file in binary reputation database 544, which may contain activity timing information about the executable file, including activity timing information about when the file was downloaded to at least one endpoint computing device. Binary reputation database 544 may additionally, or alternatively, contain activity timing information about non-binary files. Identification module 104 and/or correlation module 106 may thereby create disclosure and detection time correlations 556, including vulnerability and associated timing information 504, 506, and 512 (which may indicate a time of public disclosure of the vulnerability) and hash ID and associated timing information 548, 552, and 554 (which may indicate activity timing information about detection of file activity for files, or file variations, used by the exploit on monitored endpoint computing devices). Identification module 104 may use these correlations to thereby identify the activity timing information indicating timing of one or more activities that involve the file and that occurred on endpoint computing devices before the security vulnerability was publicly disclosed.

In general, identification module 104 and/or correlation module 106 may correlate information (including further correlations) about security vulnerabilities, exploits, files, variations of files, hashes of files and variations of files, and disclosure and activity timing information for one or more of these, across two or more databases, where one or more database does not include all of the needed timing information, to thereby identify activity timing information for a file that exploits the security vulnerability. Identification module 104 and/or correlation module 106 may generally correlate one correlation in one database (e.g. a security vulnerability correlated with disclosure timing information) with another correlation in another database (e.g. a file correlated with activity timing information) to correlate (i.e. meta-correlate) the disclosure timing information in the database with activity timing information in the other database. In other words, beginning with disclosure timing information for a security vulnerability, identification module 104 may identify activity timing information by correlating the security vulnerability with a file, hash, and/or exploit associated (e.g. that exploits) the security vulnerability.

As illustrated in FIG. 3, at step 308 one or more of the systems described herein may compare the disclosure timing information with the activity timing information to investigate a potential zero-day attack that exploits the security vulnerability. For example, at step 308 comparison module 108 may compare the disclosure timing information with the activity timing information to investigate a potential zero-day attack that exploits the security vulnerability.

Comparison module 108 may compare the disclosure timing information with the activity timing information in a variety of ways. Comparison module 108 may determine, based on comparing the activity timing information and the disclosure timing information, whether the activity timing information indicates a zero-day attack by determining whether the activity timing information indicates an earlier time than the disclosure timing information. Comparison module 108 may also determine, based on comparing the activity timing information and the disclosure timing information, that the activity timing information indicates a zero-day attack by determining that the activity timing information indicates an earlier time than the disclosure timing information. Comparison module 108 may also determine that the activity timing information does not indicate a zero-day attack by determining that the activity timing information does not indicate an earlier time than the disclosure timing information. Comparison module 108 may also determine whether the activity timing information indicates a zero-day attack by determining whether the earliest time indicates an earlier time than the disclosure timing information. As discussed above, the earliest time may indicate the earliest file activity (e.g. earliest file download) for an exploit from among all files and file variations correlated with the exploit on all (or substantially all) monitored endpoint computing devices within a designated set of endpoint computing devices and/or designated period of time. The language, "comparing the disclosure timing information with the activity timing information" also includes limiting a search of activity timing information (e.g. having correlation module 104 limits its search in step 304) within the database of file activity to that information indicating a time prior to the time indicated by the disclosure timing information, such that any positive result of the search for file activity within that time period indicates a zero-day attack.

In the example of FIG. 5, after correlation module 106 (and/or identification module 104) has established the correlations in disclosure and detection time correlations 556, comparison module 108 may compare the disclosure times (i.e. times indicated in 504, 506, and 512) with the detection times or download times (i.e. times indicated in 548, 552, and 554). At decision 558, comparison module 108 may compare the items of timing information to determine which is earlier. Comparison module may indicate a known zero-day attack, at step 560, or no known zero-day attack at step 562, based on the comparison, as shown. Comparison module 108 may also identify an intensity (based on the number of attacks or downloads recorded in telemetry hash database 528 and/or binary reputation database 544), a length, prevalence, and/or a duration of the zero-day attack. Comparison module 108 may also mark the estimated start and/or end of the zero-day attack based upon the comparison between the activity timing information and disclosure timing information. Comparison module 108 may also model the attack by presenting any form of visualization, spreadsheet, or other report indicating a behavior or spreading of the zero-day attack over time and/or geography.

Comparison module 108 may also repeat one or more steps of method 300 for a plurality of vulnerabilities, including all or substantially all vulnerabilities in (or a designated or predetermined set within) vulnerability database 502 that are correlated with known exploits in exploits database 516. Using some or all of the aggregated comparison data, comparison module 108 may estimate a frequency, prevalence, and/or intensity of zero-day attacks within a given data set or set of monitored computers or devices. Comparison module 108 may also model a plurality of zero-day attacks by presenting any form of visualization, spreadsheet, or other report indicating a behavior or spreading of the zero-day attacks over time and/or geography. Comparison module 108 may also analyze timing information and/or exploit files (and associated vulnerabilities) for plural known zero-day attacks to identify or estimate relationships between two or more zero-day attacks.

Comparison module 108 may also take remedial action. Comparison module 108 may autonomously, or upon user confirmation (e.g. after a prompt), report one or more zero-day attacks to vendors of security software, to public forums/message boards/websites about security or affected software, to vendors of software with the exploited vulnerability, to owners/users of affected/infected endpoint computing devices, the public at large, and/or any other affected or interested person. The report may identify the attack as a zero-day attack, and optionally identify the estimated start time or date of the attack, the vulnerability that the attack exploits, a duration of the attack, a prevalence of the attack, a description or indication of geographic locations or other victims involving the attack, and/or the model of the attack, as discussed above. Comparison module 108 may store, or be configured to access (locally or remotely), or autonomously find, contact information for each of the above contacts and use that information to report the zero-day attack and potential remedial measures. Comparison module 108 may also identify a remedial measure, like booting a computer into safe mode, disconnecting a network connection, and/or restoring a disk to factory settings, optionally verify that the remedial measure applies to the zero-day attack exploit, and report the potential remedial measure as a first response remedial option with the report of the zero-day attack.

In some examples, comparison module 108 may create one or more security policies and/or configure one or more security systems based on having identified the zero-day attack as a zero-day attack and/or based on one or more properties of the zero-day attack (e.g., the length of time between the estimated start time of the zero-day attack and the time that the security vulnerability was publicly disclosed). For example, comparison module 108 may configure one or more security systems to scan more aggressively (e.g., using more computing resources and/or with a bias toward false positives rather than false negatives) based on the length of the zero-day attack before public disclosure of the vulnerability.

In some embodiments, method 300 may additionally or alternatively be described as identifying anti-virus signatures that detect exploits of known vulnerabilities and determine which files are detected using these signatures. More specifically, method 300 may be implemented, in part, by using API traces collected during the dynamic analysis of malware to link initial exploits with executable files that may be dropped on the exploited hosts. Then, the submissions to reputation-based security systems may be searched for dropped executable files in order to determine when they first appeared in the field. When such an executable file is present on an end-user machine before disclosure of a vulnerability exploited by the executable file, the systems and methods described herein may infer that the executable file is part of a zero-day attack.

In at least one example, the principles and features presented above may be implemented in the following five steps. First, the systems and methods of the instant disclosure may find the disclosure date for all vulnerabilities listed in a Common Vulnerabilities and Exposures (CVE) or comparable database (and, for each CVE vulnerability, determine the virus ID (if any) of an anti-virus signature that detects the exploit of that vulnerability). Second, the systems and methods described herein may identify the hashes of files detected using these virus IDs by analyzing telemetry on virus detections (e.g. antivirus ping submissions). Certain virus IDs detect a large number of file hashes because of the polymorphism employed by malware authors to evade detection. The hashes identified in this step may not correspond to executable files.

Third, the systems and methods described herein may search among API calls recorded in the dynamic analysis traces for files that are downloaded after successful exploitations performed by the file hashes identified in the previous step. Fourth, the systems and methods described herein may search for each of these files in the telemetry collected during the normal operation of reputation-based security systems (e.g. MR. CLEAN submissions). Fifth, the systems and methods described herein may compare the start dates of each attack with the disclosure dates of the corresponding vulnerabilities. If at least one of the exploit file hashes was found in the field before the disclosure date of the corresponding vulnerability, the systems and methods described herein may report a zero-day attack, along with its duration before discovery and its prevalence in the real world. Following this process may enable systems and methods described herein to estimate when the exploits first appeared on the Internet. As there may be more than one exploit that corresponds to each vulnerability, the first executable detected may mark the start of an attack.

The systems and methods described herein may provide various features and advantages. For example, the systems and methods described herein may detect zero-day attacks by using big data analytics (e.g., examining large amounts of data of a variety of different types to uncover hidden patterns) to identify correlations between anti-virus telemetry, gathered by antivirus or other products in the field, and the results of dynamic analysis of malware samples, conducted optionally on a backend server. In particular, these correlations can expose zero-day exploits delivered through non-executable files.

In some embodiments, the systems and methods described herein may identify prior zero-day attacks systematically, by correlating telemetry received from anti-virus products around the world with traces collected in a backend server during dynamic analysis of malware samples. Such systems and methods may take advantage of the unique characteristics of antivirus telemetry and dynamic analysis traces. By correlating the information collected by reputation-based systems about the presence of binary executables (both benign and malicious) on end-user hosts with the information on malware behavior provided by the dynamic analysis, systems described herein may find zero-day attacks delivered through both executable and non-executable exploits.

Figure 6:
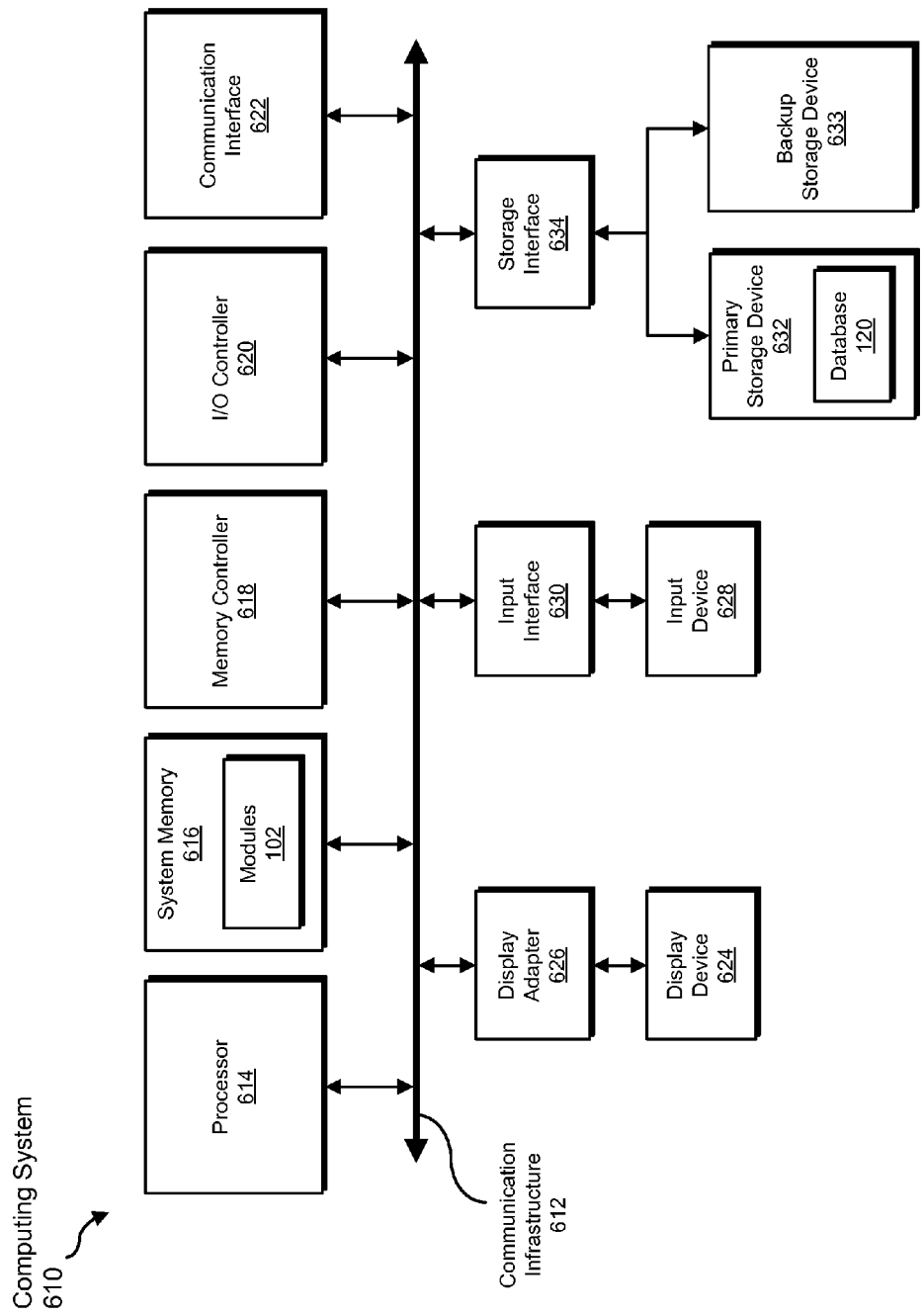
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet.

Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
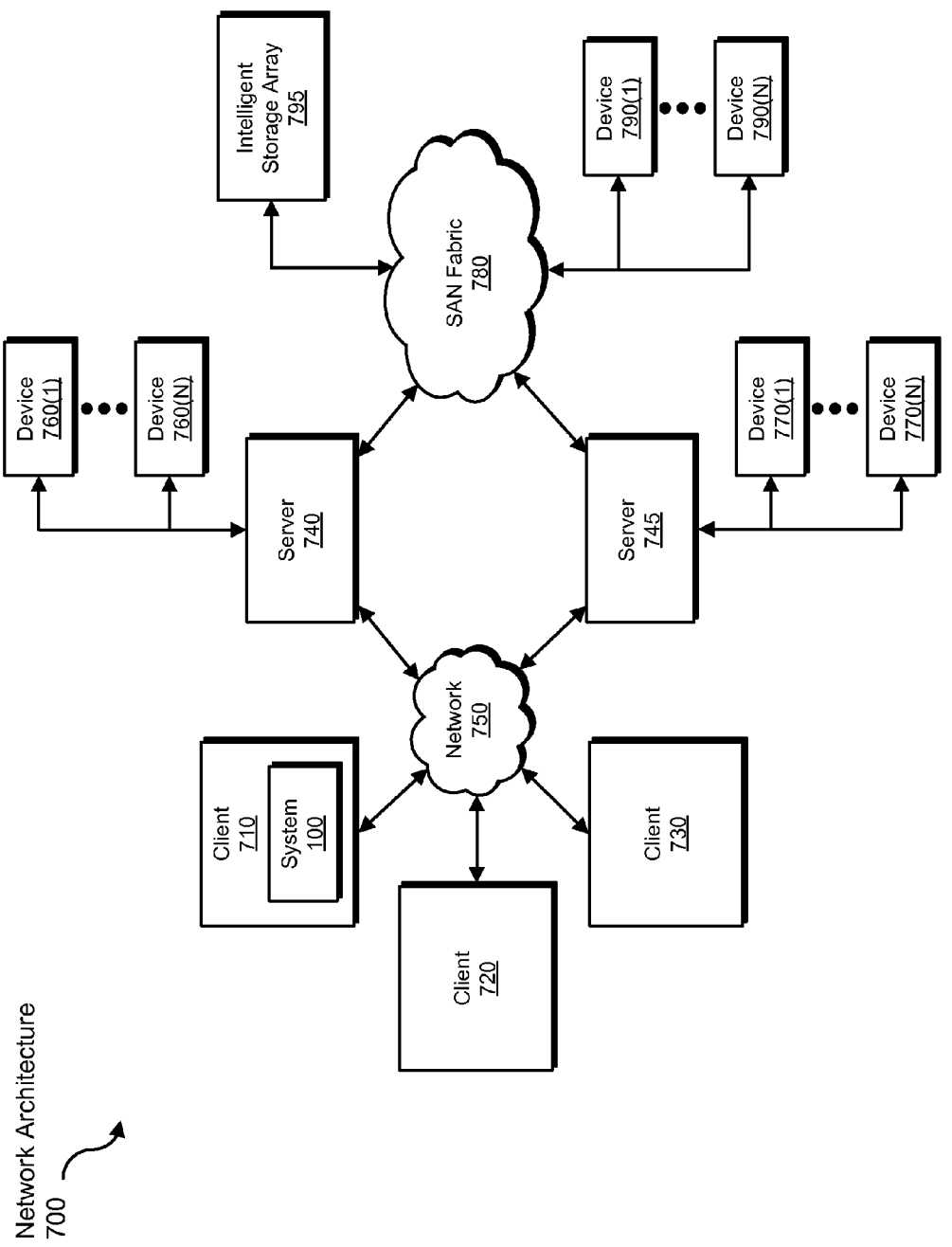
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for analyzing zero-day attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive vulnerability identifiers, exploit identifiers, file hash identifiers, and/or timing information to be transformed, transform these items of data by grouping them within one or more correlations, pairs, and/or triplets, output a result of the transformation to an administrator or user to use the result of the transformation to identify, analyze, report, and/or remediate zero-day attacks, and store the result of the transformation to one or more databases. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for analyzing zero-day attacks, at least a portion of the method being performed by a computing device comprising at least one processor, the method comprising:
   identifying, within a database of known security vulnerabilities, disclosure timing information that indicates when a security vulnerability was publicly disclosed;
   correlating a file with the security vulnerability by searching a database of file activity for at least one file that is associated with an attack that exploits the security vulnerability, wherein the database of file activity comprises binary reputation data;
   identifying, within the database of file activity, activity timing information that identifies the file by a hash identifier and timing of a plurality of activities that involve the file and that occurred on endpoint computing devices before the security vulnerability was publicly disclosed, wherein the activity timing information indicates when a client device downloaded an executable;
   comparing the disclosure timing information with the activity timing information to investigate a potential zero-day attack that exploits the security vulnerability by:
   identifying an earliest time among the plurality of activities that involve the file;
   determining whether the activity timing information indicates a zero-day attack by determining whether the earliest time indicates an earlier time than the disclosure timing information.

2. The method of claim 1, wherein comparing the disclosure timing information with the activity timing information comprises at least one of:
   determining that the activity timing information indicates a zero-day attack by determining that the disclosure timing information indicates an earlier time than the activity timing information;

determining that the activity timing information does not indicate a zero-day attack by determining that the disclosure timing information does not indicate an earlier time than the activity timing information.

3. The method of claim 1, wherein:
the database of known security vulnerabilities comprises a public database;
the disclosure timing information indicates when the security vulnerability was made known in the public database.

4. The method of claim 1, wherein the disclosure timing information indicates when a software patch was released.

5. The method of claim 4, wherein the disclosure timing information comprises timing information posted on a public website about security vulnerabilities.

6. The method of claim 1, wherein:
the database of file activity comprises antivirus telemetry data;
the activity timing information indicates when an antivirus program detected a threat.

7. The method of claim 6, further comprising:
identifying when the antivirus program on a client device detected the threat;
determining that the client device downloaded an executable after the antivirus program detected the threat;
correlating in memory the downloaded executable with the threat detection.

8. The method of claim 1, wherein identifying the database of known security vulnerabilities comprises constructing the database of file activity by:
identifying a third database indicating security vulnerabilities;
identifying a fourth database indicating security exploits;
correlating, in the database of known security vulnerabilities, security vulnerabilities from the third database with exploits from the fourth database that exploit a respective security vulnerability.

9. The method of claim 8, wherein identifying the database of known security vulnerabilities comprises constructing the database by correlating at least one hash with each of the exploits that are further correlated with a respective security vulnerability.

10. A system for analyzing zero-day attacks, the system comprising:
an identification module that identifies, within a database of known security vulnerabilities, disclosure timing information that indicates when a security vulnerability was publicly disclosed;
a correlation module that correlates a file with the security vulnerability by searching a database of file activity for at least one file that is associated with an attack that exploits the security vulnerability, wherein the database of file activity comprises binary reputation data;
wherein the identification module further identifies, within the database of file activity, activity timing information that identifies the file by a hash identifier and timing of a plurality of activities that involve the file and that occurred on endpoint computing devices before the security vulnerability was publicly disclosed, wherein the activity timing information indicates when a client device downloaded an executable;
a comparison module that compares the disclosure timing information with the activity timing information to investigate a potential zero-day attack that exploits the security vulnerability by:
identifying an earliest time among the plurality of activities that involve the file;
determining whether the activity timing information indicates a zero-day attack by determining whether the earliest time indicates an earlier time than the disclosure timing information;
at least one processor that executes the identification module, the correlation module, and the comparison module.

11. The system of claim 10, wherein the comparison module compares the disclosure timing information with the activity timing information at least in part by:
determining that the activity timing information indicates a zero-day attack by determining that the disclosure timing information indicates an earlier time than the activity timing information;
determining that the activity timing information does not indicate a zero-day attack by determining that the disclosure timing information does not indicate an earlier time than the activity timing information.

12. The system of claim 10, wherein:
the database of known security vulnerabilities comprises a public database;
the disclosure timing information indicates when the security vulnerability was made known in the public database.

13. The system of claim 10, wherein the disclosure timing information indicates when a software patch was released.

14. The system of claim 13, wherein the disclosure timing information comprises timing information posted on a public website about security vulnerabilities.

15. A non-transitory computer-readable medium comprising one or more computer-executable instructions that, when executed by at least one processor of a computing device, cause the computing device to:
identify, within a database of known security vulnerabilities, disclosure timing information that indicates when a security vulnerability was publicly disclosed;
correlate a file with the security vulnerability by searching a database of file activity for at least one file that is associated with an attack that exploits the security vulnerability, wherein the database of file activity comprises binary reputation data;
identify, within the database of file activity, activity timing information that identifies the file by a hash identifier and timing of plurality of activities that involve the file and that occurred on endpoint computing devices before the security vulnerability was publicly disclosed, wherein the activity timing information indicates when a client device downloaded an executable;
compare the disclosure timing information with the activity timing information to investigate a potential zero-day attack that exploits the security vulnerability by:
identifying an earliest time among the plurality of activities that involve the file;
determining whether the activity timing information indicates a zero-day attack by determining whether the earliest time indicates an earlier time than the disclosure timing information.

16. The computer-readable medium of claim 15, wherein comparing the disclosure timing information with the activity timing information comprises at least one of:
determining that the activity timing information indicates a zero-day attack by determining that the disclosure timing information indicates an earlier time than the activity timing information;
determining that the activity timing information does not indicate a zero-day attack by determining that the disclosure timing information does not indicate an earlier time than the activity timing information.

17. The computer-readable medium of claim 15, wherein:
- the database of known security vulnerabilities comprises a public database;
- the disclosure timing information indicates when the security vulnerability was made known in the public database.

18. The computer-readable medium of claim 15, wherein the disclosure timing information indicates when a software patch was released.

19. The computer-readable medium of claim 18, wherein the disclosure timing information comprises timing information posted on a public website about security vulnerabilities.

20. The computer-readable medium of claim 15, wherein:
- the database of file activity comprises antivirus telemetry data;
- the activity timing information indicates when an antivirus program detected a threat.

\* \* \* \* \*